United States Patent
Tsai et al.

(10) Patent No.: US 7,647,512 B2
(45) Date of Patent: Jan. 12, 2010

(54) METHOD AND APPARATUS FOR SWITCHING PERFORMANCE

(75) Inventors: Cheng-Kai Tsai, Taipei (TW); Jiun-Liang Wu, Taipei (TW); Chuan-Te Chang, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 418 days.

(21) Appl. No.: 11/746,653

(22) Filed: May 10, 2007

(65) Prior Publication Data
US 2007/0263416 A1     Nov. 15, 2007

(30) Foreign Application Priority Data
May 11, 2006   (TW) ............................... 95116720 A (51) Int. Cl.
G06F 1/00        (2006.01)
G06F 1/04        (2006.01)
(52) U.S. Cl. ...................................... 713/300; 713/501
(58) Field of Classification Search ................. 713/300, 713/501
See application file for complete search history.

(56) References Cited

U.S. PATENT DOCUMENTS

| 6,788,156 | B2 * | 9/2004 | Tam et al. ...................... 331/49 |
| 7,035,946 | B2 * | 4/2006 | Song et al. .................... 710/10 |
| 7,493,149 | B1 * | 2/2009 | Doyle et al. ................. 455/574 |
| 7,554,368 | B2 * | 6/2009 | Yu .............................. 327/113 |
| 2003/0206071 | A1 * | 11/2003 | Wong et al. .................. 331/176 |
| 2004/0090808 | A1 * | 5/2004 | Meguro ...................... 363/165 |
| 2007/0016814 | A1 * | 1/2007 | Rusu et al. ................... 713/320 |

FOREIGN PATENT DOCUMENTS

| CN | 1515974 | 7/2004 |
| CN | 1567180 | 1/2005 |

* cited by examiner

*Primary Examiner*—Evan Pert
(74) *Attorney, Agent, or Firm*—Jianq Chyun IP Office (57) ABSTRACT

A method and an apparatus for switching performance are provided. The method includes: providing a performance adjustable circuit working at a specific threshold frequency; determining a working power supply of the performance adjustable circuit; when the working power supply is higher or lower than a specific threshold level range corresponding to the specific threshold, adjusting the performance adjustable circuit to work at another specific threshold frequency.

19 Claims, 5 Drawing Sheets

METHOD AND APPARATUS FOR SWITCHING PERFORMANCE

CROSS-REFERENCE TO RELATED APPLICATION

This application claims the priority benefit of Taiwan application serial no. 95116720, filed May 11, 2006. All disclosure of the Taiwan application is incorporated herein by reference.

BACKGROUND OF THE INVENTION

1. Field of Invention

The present invention relates to a method and an apparatus for reducing electric power consumption. More particularly, the present invention relates to a method and an apparatus for controlling the performance of a performance controllable circuit according to load states, thus controlling the peripheral apparatuses of the circuit, so as to provide different performances on various demands and achieve an optimal power-saving effect without affecting the normal operation of the system.

2. Description of Related Art

Recently, along with the progress in electronic science & technology, a variety of electronic products has entered our work and life. Especially, the emergence of computer has a great impact on us. At present, the types of a common personal computer (PC) include a desktop computer and a portable computer, wherein the type of the portable computer further includes notebook PCs, pocket PCs, tablet PCs and so on.

In a computer system, the CPU consumes most power for the power consumption of the whole system. The power consumption of the CPU is increased with the raising of the operating frequency and the core voltage. For portable electronic devices operated by cell, such as mobile phones, pocket PCs (personal digital assistants), digital cameras and notebook PCs, an important topic is to reduce the power requirement of the CPU.

A conventional notebook PC is provided with a software system designed for manually adjusting the CPU performance. The software system provides various performance settings for the CPU. When a user wants a high performance, the software can be manually adjusted, such that the software can control the CPU to operate at a relatively high frequency for providing a relatively high performance.

However, as for manual adjustment, when the notebook PC is idle, if the user forgets to turn down the operating frequency of the CPU via the software system, the heat-sink fan keeps on rotating at a high speed, thus causing noises and reduction of the duration of the cell. In another aspect, when the user is executing an arduous program, if the user forgets to raise the operating frequency of the CPU via the software system, the notebook PC may not operate smoothly, thus affecting the normal operation of the operating system of the notebook PC.

SUMMARY OF THE INVENTION

Accordingly, an objective of the present invention is to provide an apparatus for switching performance, which is used to control the performance of a performance controllable circuit according to load states, so as to achieve an optimal power-saving effect without affecting the normal operation of the system.

Another objective of the present invention is to provide a method for switching performance, which is used to control the performance of the performance controllable circuit or peripheral apparatuses of the above circuit, so as to provide different performances on various demands, thereby reducing the power consumption.

The present invention provides an apparatus for switching performance. The apparatus comprises a performance adjustable circuit, a power supply and a performance control apparatus. The power supply is coupled to the performance adjustable circuit for providing a working power supply to the performance adjustable circuit. The performance control apparatus is coupled to the power supply and the performance adjustable circuit. The performance control apparatus comprises a first threshold and a corresponding first threshold level range, and a second threshold and a corresponding second threshold level range. The first threshold and the second threshold respectively correspond to the frequency of the performance adjustable circuit, while the first threshold level range and the second threshold level range respectively correspond to the working power supply when the performance adjustable circuit works at the first threshold and the second threshold.

In the apparatus for switching performance according to a preferred embodiment of the present invention, the above performance control apparatus comprises a load detection circuit and a performance adjusting apparatus. The load detection circuit is coupled to the power supply and the performance adjustable circuit for generating a power supply data according to the value of the working power supply. The performance adjusting apparatus coupled to the load detection circuit comprises M threshold data, wherein the $i^{th}$ threshold data and the $(i+1)^{th}$ threshold data correspond to the $i^{th}$ threshold level range. When the power supply data falls between the $i^{th}$ threshold data and the $(i+1)^{th}$ threshold data, the performance adjustable circuit is controlled to operate at the $i^{th}$ frequency. M and i are natural numbers larger than 0, and M>i.

In the apparatus for switching performance according to a preferred embodiment of the present invention, the performance adjustable circuit comprises a CPU, a CPU fan and a clock generating circuit. In the embodiment, the performance adjusting apparatus is a south bridge chip for receiving the power supply data output by the load detection circuit via a general-purpose input/output (GPIO) interface. Moreover, in the embodiment, the working power supply is, for example, a working current, and the load detection circuit comprises a comparison circuit and a logic circuit. The comparison circuit is coupled to the power supply and the performance adjustable circuit for receiving and determining the value of the working current. The logic circuit is coupled to the comparison circuit and outputs the power supply data according to the value of the working current.

In the apparatus for switching performance according to a preferred embodiment of the present invention, the above-mentioned performance control apparatus comprises a load detection circuit and a performance adjusting apparatus. The load detection circuit coupled to the power supply and the performance adjustable circuit comprises M threshold data, wherein the $i^{th}$ threshold data and the $(i+1)^{th}$ threshold data correspond to the $i^{th}$ threshold level range. When the value of the working power supply falls between the $i^{th}$ threshold data and the $(i+1)^{th}$ threshold data, the $i^{th}$ performance data is output. The performance adjusting apparatus is coupled to the load detection circuit and controls the performance adjustable circuit to operate at the $i^{th}$ frequency according to the received $i^{th}$ performance data. M and i are natural numbers larger than 0, and M>i.

In the apparatus for switching performance according to a preferred embodiment of the present invention, the performance adjusting apparatus is a south bridge chip. The south bridge chip receives the power supply data output by the load detection circuit via a GPIO interface. Moreover, in the embodiment, the working power supply is, for example, a working current, and the load detection circuit comprises a comparison circuit and a logic circuit. The comparison circuit is coupled to the power supply and the performance adjustable circuit for receiving the working current. When the value of the working current falls between the $i^{th}$ threshold data and the $(i+1)^{th}$ threshold data, the $i^{th}$ adjusting data is output. The logic circuit is coupled to the comparison circuit and outputs the $i^{th}$ performance data according to the $i^{th}$ adjusting data.

The present invention provides a method for switching performance. The method comprises: providing a performance adjustable circuit working at a specific threshold frequency; determining a working power supply of the performance adjustable circuit; and adjusting the performance adjustable circuit to work at another specific threshold frequency when the working power supply is higher or lower than a specific threshold level range corresponding to the specific threshold.

In the method for switching performance according to a preferred embodiment of the present invention, the step of determining the working power supply of the performance adjustable circuit comprises providing a power supply data according to the value of the working power supply. Moreover, the step of adjusting the performance adjustable circuit to work at another specific threshold frequency when the working power supply is higher or lower than a specific threshold level range corresponding to the specific threshold comprises: providing a plurality of threshold data, wherein the $i^{th} \sim (i+1)^{th}$ threshold data represent the $i^{th}$ specific threshold level range; providing a plurality of threshold frequencies corresponding to the threshold data; and controlling the performance adjustable circuit to operate at the $i^{th}$ threshold frequency when the power supply data falls between the $i^{th}$ threshold data and the $(i+1)^{th}$ threshold data, wherein i is a natural number.

In the method for switching performance according to a preferred embodiment of the present invention, the performance adjustable circuit comprises a CPU, a CPU fan and a clock generating circuit. The first specific frequency is the operating frequency of the CPU, the operating frequency of the CPU fan and the clock frequency of the clock generating circuit. Moreover, in the embodiment, the working power supply is, for example, the working current or the working voltage.

In the method for switching performance according to a preferred embodiment of the present invention, the above step further comprises detecting the type of the CPU; and determining the threshold data according to the type of the CPU.

The present invention controls the performance of the performance controllable circuit according to load states, so as to control the peripheral apparatuses of the circuit, thereby providing different performances on various demands and achieving an optimal power-saving effect without affecting the normal operation of the system.

In order to make the aforementioned and other objects, features and advantages of the present invention comprehensible, preferred embodiments accompanied with figures are described in detail below.

DESCRIPTION OF EMBODIMENTS

Figure 1:
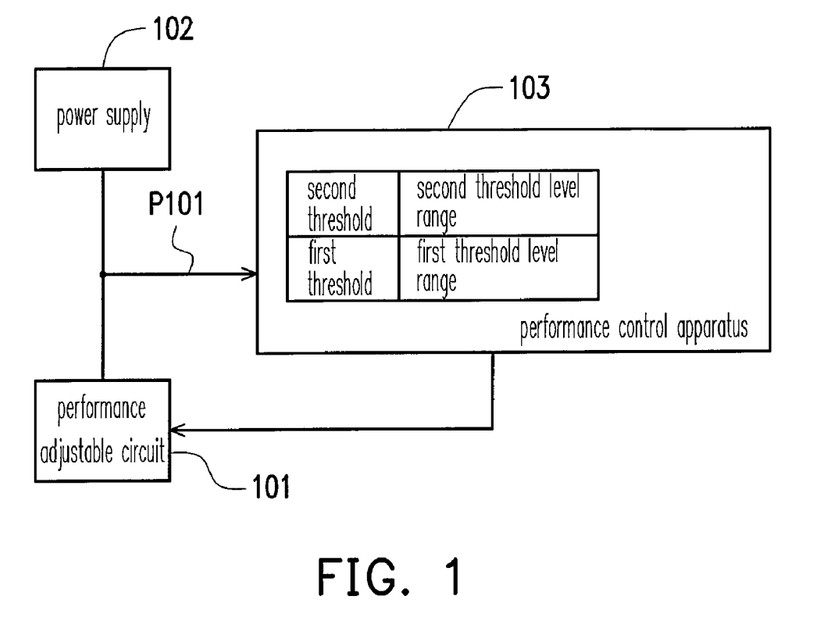
FIG. 1 is a circuit block diagram of the apparatus for switching performance according to an embodiment of the present invention.

FIG. 1 is a circuit block diagram of the apparatus for switching performance according to an embodiment of the present invention. Referring to FIG. 1, the circuit comprises a performance adjustable circuit 101, a power supply 102 and a performance control apparatus 103. The power supply 102 provides a working power supply P101 to the performance adjustable circuit 101. The performance control apparatus 103 comprises a first threshold and a second threshold respectively corresponding to the first threshold level range and the second threshold level range. The first threshold and the second threshold respectively correspond to the frequency of the performance adjustable circuit. The first threshold level range corresponds to the working power supply P101 when the performance adjustable circuit 101 works at the first threshold. The second threshold level range corresponds to the working power supply P101 when the performance adjustable circuit 101 works at the second threshold.

Figure 2:
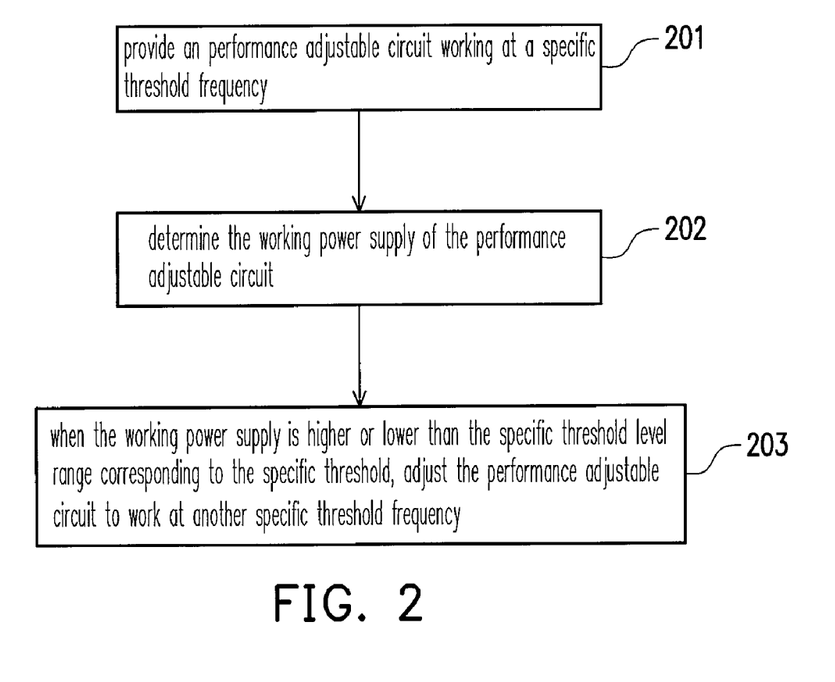
FIG. 2 is a flow chart of the method for switching performance according to an embodiment of the present invention.

FIG. 2 is a flow chart of the method for switching performance according to an embodiment of the present invention. In order to illustrate the spirit of the present invention, the flow of the method for switching performance according to the embodiment of the present invention in FIG. 2 is illustrated by the circuit in FIG. 1. Referring to FIG. 1 and FIG. 2, first, a performance adjustable circuit 101 is provided, which works at a specific threshold frequency, for example, a first threshold frequency (Step 201). Next, the value of the working power supply P101 of the performance adjustable circuit 101 is determined by the performance control apparatus 103 coupled between the performance adjustable circuit 101 and the power supply 102 (Step 202). Finally, when the working power supply P101 is higher or lower than the specific threshold level range corresponding to the specific threshold, the performance adjustable circuit is adjusted to work at another specific threshold frequency, for example, when the working power supply P101 is higher than the first threshold level range, the performance adjustable circuit is adjusted to work at a second specific threshold frequency (Step 203).

It should be noted that, although a possible mode of the apparatus and method for switching performance is provided in the above embodiment, it is known to those of ordinary skill in the art that the design manner of the performance control apparatus 103 from each manufacturer is different, so the application of the present invention is not limited to the possible mode. In other words, as long as the performance control apparatus 103 comprises at least the first threshold and the second threshold respectively corresponding to the first threshold level range and the second threshold level range, and switches the threshold frequency according to the working power supply P101 of the performance adjustable circuit 101, the spirit of the present invention is met.

Next, several embodiments are given for enabling those skilled in the art to easily implement the present invention.

Figure 3:
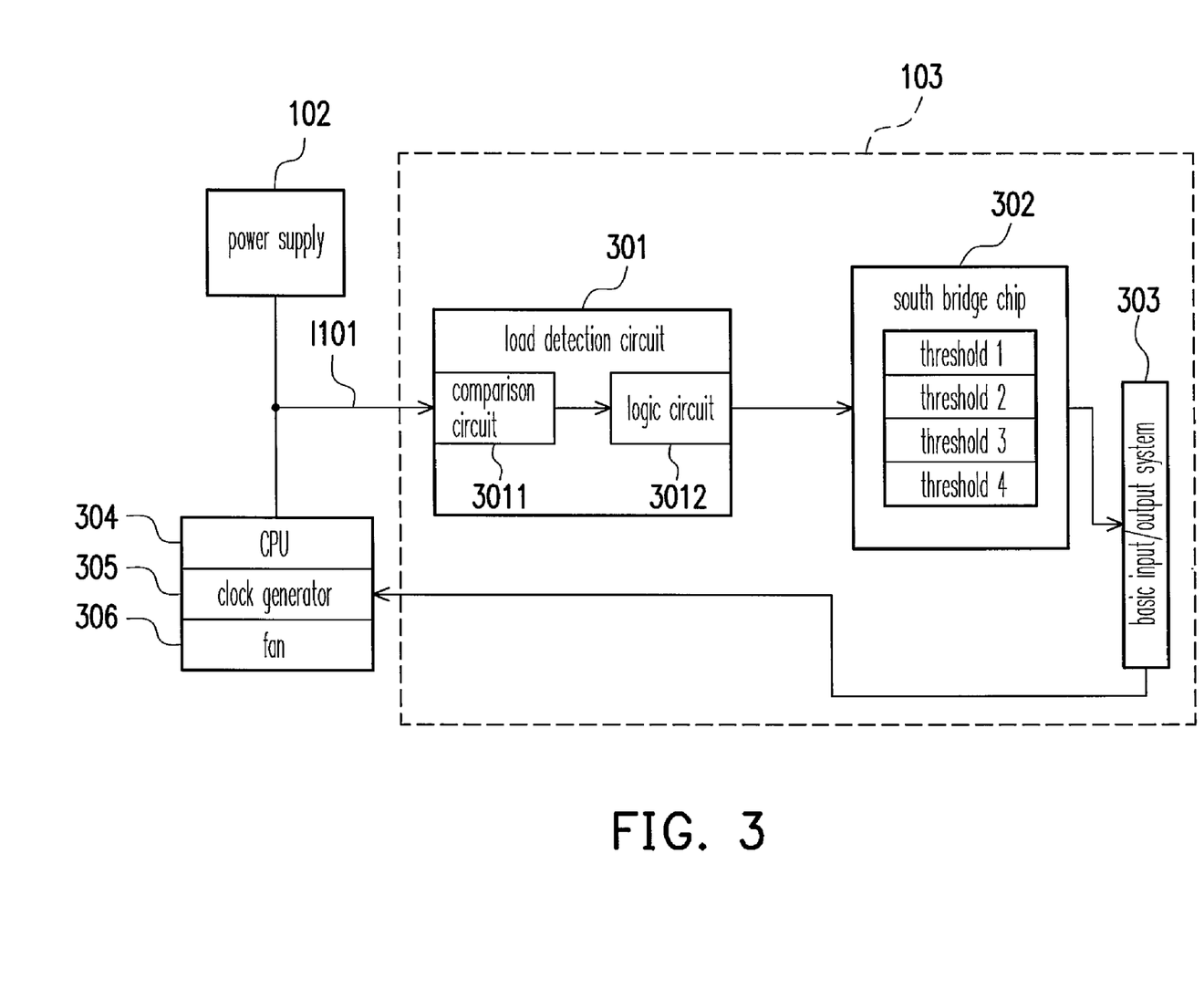
FIG. 3 is a further implementation circuit diagram of the apparatus for switching performance in FIG. 1.

Referring to FIG. 3, it is a preferred circuit diagram of the apparatus for switching performance according to the embodiment of the present invention in FIG. 1. Referring to the figure, in the present embodiment, the performance control apparatus 103 in FIG. 3 comprises a load detection circuit 301, a south bridge chip 302 and a basic input/output system 303, wherein the load detection circuit 301 comprises a comparison circuit 3011 and a logic circuit 3012. The performance adjustable circuit 101 is, for example, a CPU 304, a clock generator 305 and a fan 306. Further, in the embodiment, the working power supply P101 in FIG. 1 is, for example, a load current indication signal I101 relative to the load current, and the load current indication signal I101 is assumed to be enhanced with the increase of the load current. It is known to those of ordinary skill in the art that the performance adjustable circuit 101 provided by the present invention is, for example, a micro processor, a digital image processor (DIP) or a digital signal processor (DSP), so the present invention does not limit the performance adjustable circuit 101 to be the above-mentioned CPU 304, the clock generator 305 and the fan 306.

In the present embodiment, the load detection circuit 301 receives the load current indication signal I101 of the CPU, and the comparison circuit 3011 and the logic circuit 3012 transmit a digital signal of the load current indication signal I101 to the south bridge chip 302. The south bridge chip 302 receives the digital signal via the GPIO interface, and compares the digital signal with thresholds 1~4. Assume that the comparison result falls between thresholds 3~4, the load current indication signal I101 thus falls between thresholds 3~4. Then, a data representing "the load current indication signal I101 falls between thresholds 3~4" is transmitted to the basic input/output system 303 via, for example, a low pin count bus (LPC bus).

Next, the basic input/output system 303 receives the above data, and accordingly controls the CPU 304, the clock generating circuit 305 and the fan 306 to operate at the frequency between thresholds 3~4. Here, assume the above processed data represents that the load current indication signal I101 falls between thresholds 3~4, the basic input/output system 303 controls the CPU 304 to operate at the third threshold frequency, for example, the frequency of 500 MHz. If the above processed data represents that the load current indication signal I101 falls between thresholds 2~3, the basic input/output system 303 controls the CPU 304 to operate at the second threshold frequency, for example, the frequency of 1 GHz. If the above processed data represents that the load current indication signal I101 falls between thresholds 1~2, the basic input/output system 303 controls the CPU 304 to operate at the first threshold frequency, for example, the frequency of 1.5 GHz.

When the load current of the CPU 304 is increased, the load current indication signal I101 is enhanced. Assume the comparison result of the load current indication signal I101 and thresholds 1~4 performed by the comparison circuit 3011 is that the load current indication signal I101 falls between thresholds 2~3, the CPU 304 is thus processing an arduous program. If the CPU 304 keeps working at the present frequency, the user may feel that the computer does not operate smoothly. At this time, according to the above mechanism, the operating frequency of the CPU 304 is raised to the second threshold frequency of 1 GHz, and the fan and the clock generating circuit are controlled correspondingly to work at a higher operating frequency, such that the user may not feel the unsmooth operation of the computer.

The above three threshold level ranges, thresholds 1~2, thresholds 2~3 and thresholds 3~4, are taken as examples. It is known to those of ordinary skill in the art that according to the spirit of the present invention, the present invention still has four or more implementation aspects of the threshold level range, so the present invention is not limited herein.

Figure 4:
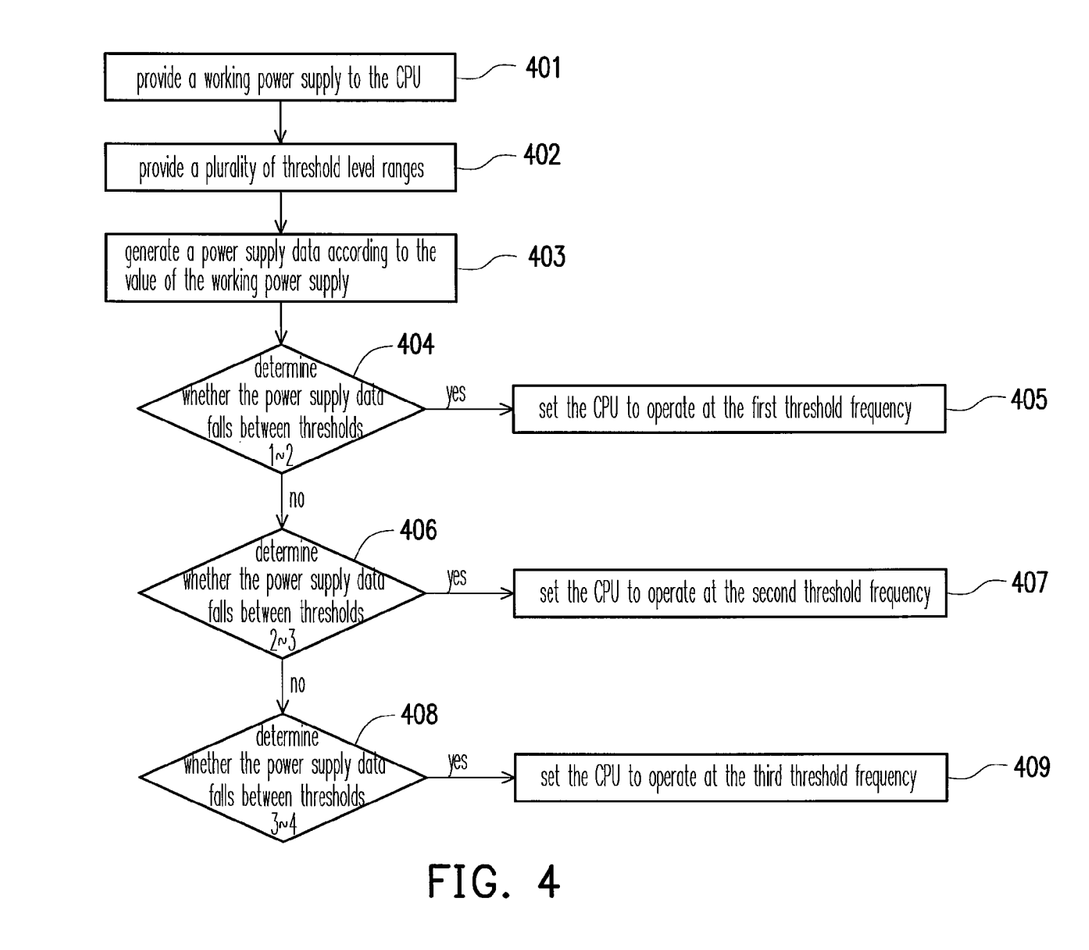
FIG. 4 is a preferred flow chart of the method for switching performance according to an embodiment of the present invention in FIG. 2.

FIG. 4 is a preferred flow chart of the method for switching performance according to the embodiment of the present invention in FIG. 2. Referring to FIG. 4, first, a working power supply is provided for the CPU (Step 401). Next, a plurality of threshold level ranges (Step 402) is provided. According to the value of the working power supply, a power supply data is generated (Step 403), for example, in the above embodiment, the digital signal generated by the logic circuit of the load detection circuit 301. Next, Steps 404, 406 and 408 determine which of the above three threshold level ranges the power supply data falls. If the power supply data falls between the first threshold and the second threshold, the CPU is set to operate at the first threshold frequency (Step 405). If the power supply data falls between the second threshold and the third threshold, the CPU is set to operate at the second threshold frequency (Step 407). If the power supply data falls between the third threshold and the fourth threshold, the CPU is set to operate at the third threshold frequency (Step 409).

Figure 5:
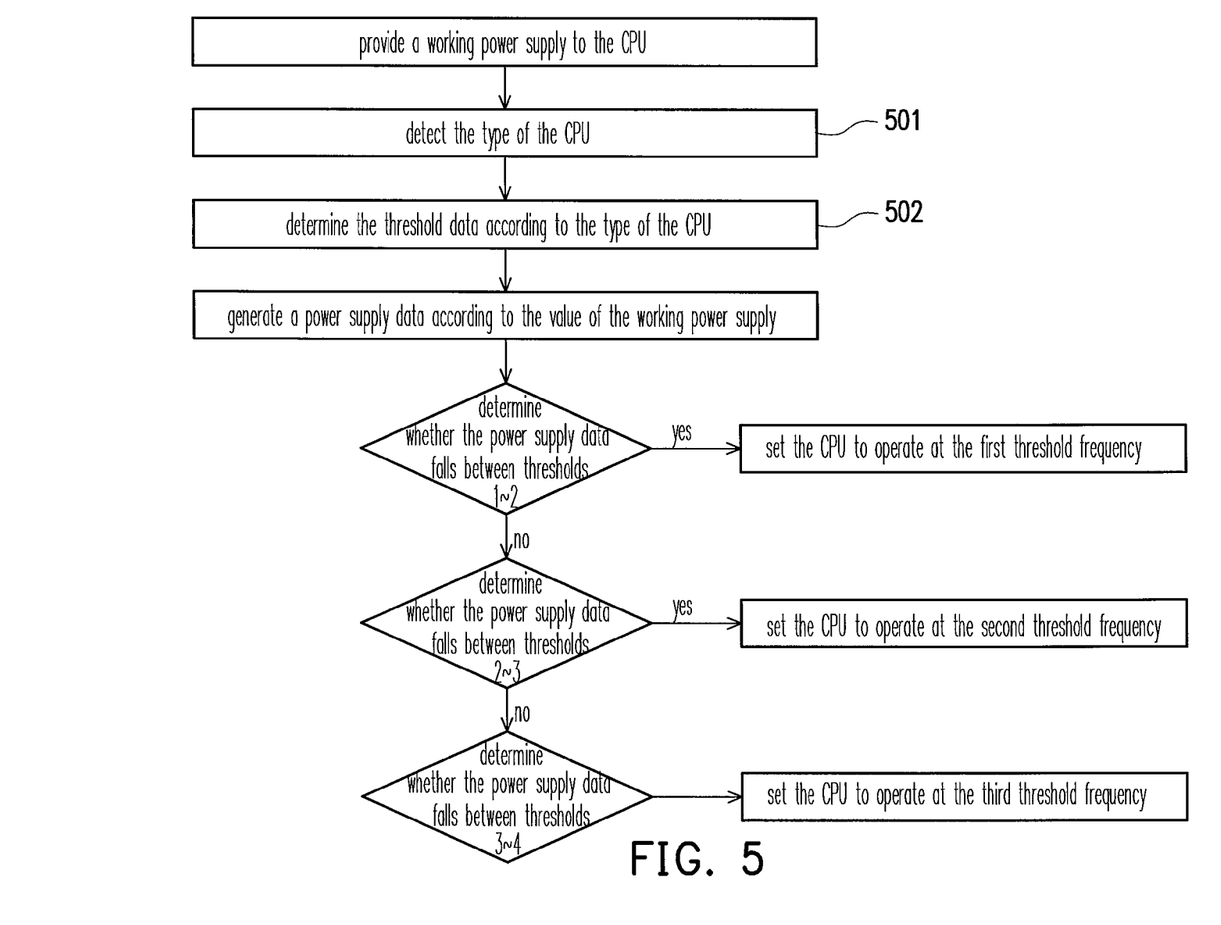
FIG. 5 is a further preferred flow chart of the method for switching performance according to an embodiment of the present invention in FIG. 4.

Similarly, referring to FIG. 5, it is a further preferred flow chart of the method for switching performance according to the embodiment of the present invention in FIG. 4. Referring to FIG. 4, the difference from the above flow is that the present flow has an additional step of detecting the type of the CPU (Step 501). Further, in the present flow, the former Step 402 is replaced by a step of determining a plurality of threshold data according to the type of the CPU (Step 502). Moreover, the method can set different threshold level ranges according to various types of the processor, so as to achieve an optimal performance and power-saving ratio.

Figure 6:
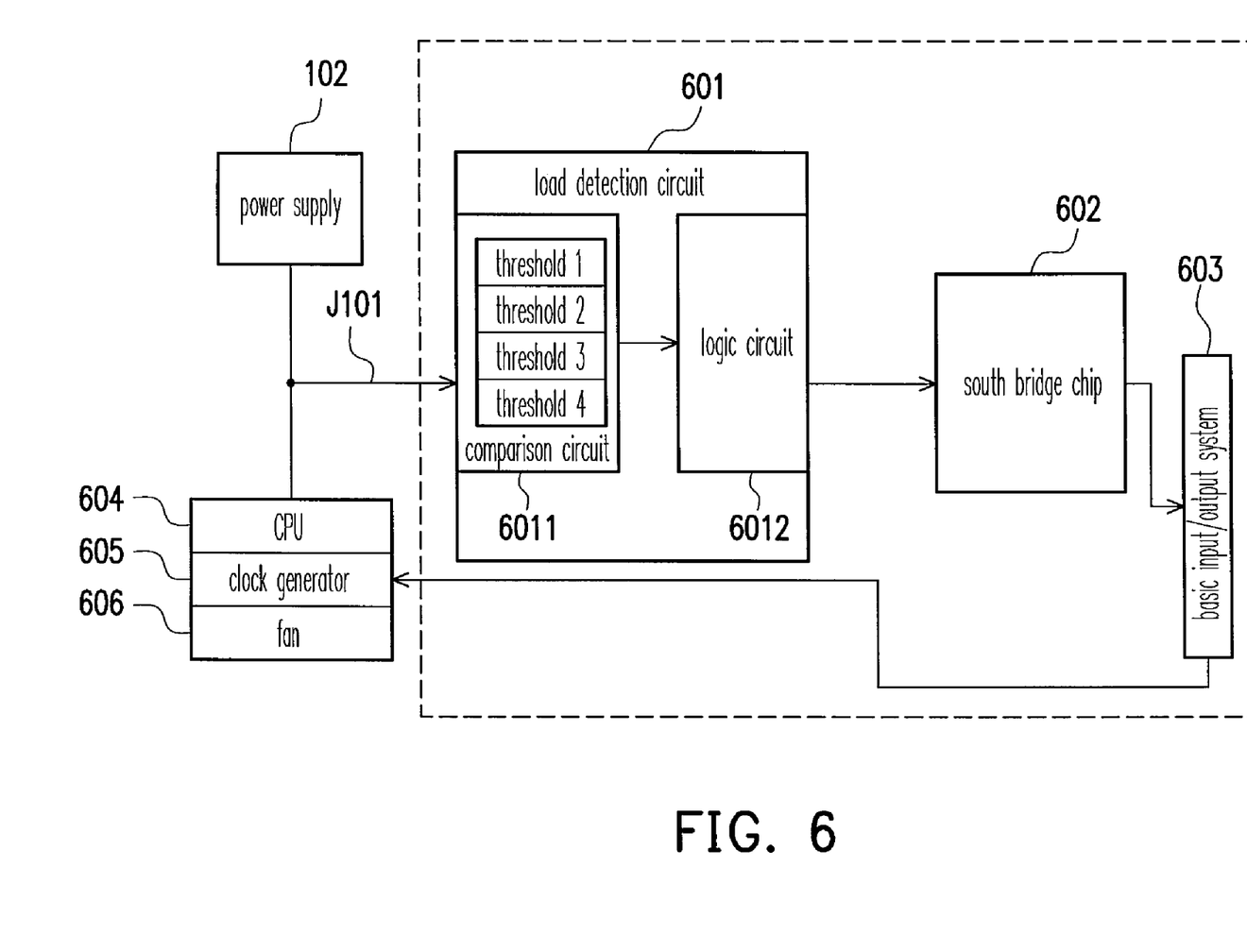
FIG. 6 is a further implementation circuit diagram of the apparatus for switching performance in FIG. 1.

Under the spirit of the present invention, the above embodiment in FIG. 3 may also be implemented by the manner in FIG. 6. Referring to FIG. 6, it is a preferred implementation circuit diagram of the apparatus for switching performance according to the embodiment of the present invention in FIG. 1. According to the figure, in the present embodiment, the performance control apparatus 103 in FIG. 6 also comprises a load detection circuit 601, a south bridge chip 602 and a basic input/output system 603, wherein the load detection circuit 601 further comprises a comparison circuit 6011 and a logic circuit 6012. The performance adjustable circuit 101 is still, for example, a CPU 604, a clock generator 605 and a fan 606. Moreover, in the present embodiment, the working power supply P101 in FIG. 1 is, for example, a load current indication signal J101 relative to the load current, and the load current indication signal J101 is assumed to be enhanced with the increase of the load current.

In the present embodiment, the load detection circuit 601 receives the load current indication signal J101 of the CPU, and the comparison circuit 6011 compares the load current indication signal J101 with thresholds 1~4 inside. Assume that the sequence of the value of the thresholds is that threshold 1>threshold 2>threshold 3>threshold 4 and assume that when being turned on, the load current indication signal J101 falls between thresholds 3~4. Next, the logic circuit 6012 transmits a digital signal representing "the load current indication signal J101 falls between thresholds 3~4" to the south bridge chip 602. The south bridge chip 602 then receives the digital signal via the GPIO interface, and transmits the processed data to the basic input/output system 603 via, for example, the LPC bus.

Then, the basic input/output system 603 receives the above processed data, and accordingly controls the CPU 604, the clock generating circuit 605 and the fan 606 to operate at the frequency between thresholds 3~4. Here, assume the processed data represents that the load current indication signal J101 falls between thresholds 3~4, the basic input/output system 603 controls the CPU 604 to operate at the third threshold frequency, for example, the frequency of 500 MHz. If the processed data represents that the load current indication signal J101 falls between thresholds 2~3, the basic input/output system 603 controls the CPU 604 to operate at the second threshold frequency, for example, the frequency of 1 GHz. If the processed data represents that the load current indication signal J101 falls between thresholds 12, the basic input/output system 603 controls the CPU 604 to operate at the first threshold frequency, for example, the frequency of 1.5 GHz.

When the load current of the CPU 604 is increased, the load current indication signal J101 is enhanced. Assume that the comparison result of the load current indication signal J101 and thresholds 1~4 performed by the comparison circuit 6011 is that the load current indication signal J101 falls between thresholds 2~3, the CPU 604 is processing an arduous program. If the CPU 604 keeps working at the present frequency, the user may feel that the computer does not operate smoothly. At this time, according to the above mechanism, the operating frequency of the CPU 604 is raised to the second threshold frequency of 1 GHz, and the fan and the clock generating circuit are controlled correspondingly to work at a higher operating frequency, such that the user may not feel the unsmooth operation of the computer.

Similarly, the above three threshold level ranges, thresholds 1~2, thresholds 2~3 and thresholds 3~4, are taken as examples. It is known to those of ordinary skill in the art that according to the spirit of the present invention, the present invention still has four or more implementation aspects of the threshold level range, so the present invention is not limited herein.

In view of the above, the present invention controls the performance of the performance controllable circuit according to load states, so as to control the peripheral apparatuses of the circuit, thereby providing different performances on various demands and achieving an optimal power-saving effect without affecting the normal operation of the system.

Though the present invention has been disclosed above by the preferred embodiments, they are not intended to limit the present invention. Anybody of ordinary skill in the art can make some modifications and variations without departing from the spirit and scope of the present invention. Therefore, the protecting range of the present invention falls in the appended claims.

What is claimed is:

1. An apparatus for switching performance, comprising:
   a performance adjustable circuit;
   a power supply, coupled to the performance adjustable circuit, for providing a working power supply for the performance adjustable circuit; and
   a performance control apparatus, coupled to the power supply and the performance adjustable circuit, the performance control apparatus comprising a first threshold and a corresponding first threshold level range and a second threshold and a corresponding second threshold level range, wherein the first threshold and the second threshold respectively correspond to different operating frequencies of the performance adjustable circuit, wherein the first threshold level range and the second threshold level range respectively correspond to the working power supply when the performance adjustable circuit works at the first threshold and the second threshold.

2. The apparatus for switching performance as claimed in claim 1, wherein the performance control apparatus comprises:
   a load detection circuit, coupled to the power supply and the performance adjustable circuit, for generating a power supply data according to the value of the working power supply; and
   a performance adjusting apparatus, coupled to the load detection circuit, comprising M threshold data with the $i^{th}$ threshold data and the $(i+1)^{th}$ threshold data corresponding to the $i^{th}$ threshold level range, wherein when the power supply data falls between the $i^{th}$ threshold data and the $(i+1)^{th}$ threshold data, the performance adjustable circuit is controlled to operate at the $i^{th}$ frequency, and M, i are natural numbers larger than 0, M>i.

3. The apparatus for switching performance as claimed in claim 1, wherein the performance adjustable circuit comprises a CPU.

4. The apparatus for switching performance as claimed in claim 1, wherein the performance adjustable circuit comprises a CPU fan.

5. The apparatus for switching performance as claimed in claim 1, wherein the performance adjustable circuit comprises a clock generating circuit.

6. The apparatus for switching performance as claimed in claim 2, wherein the performance adjusting apparatus is a south bridge chip, for receiving the power supply data output by the load detection circuit via a general-purpose input/output (GPIO) interface.

7. The apparatus for switching performance as claimed in claim 2, wherein the working power supply comprises a working current, the load detection circuit comprising:
   a comparison circuit, coupled to the power supply and the performance adjustable circuit, for receiving the working current and determining the value thereof; and
   a logic circuit, coupled to the comparison circuit, for outputting the power supply data according to the value of the working current.

8. The apparatus for switching performance as claimed in claim 1, wherein the performance control apparatus comprises:
   a load detection circuit, coupled to the power supply and the performance adjustable circuit, and comprising M threshold data, wherein the $i^{th}$ threshold data and the $(i+1)^{th}$ threshold data correspond to the $i^{th}$ threshold level range, when the value of the power supply data falls between the $i^{th}$ threshold data and the $(i+1)^{th}$ threshold data, the $i^{th}$ performance data is output; and
   a performance adjusting apparatus, coupled to the load detection circuit, for controlling the performance adjustable circuit to operate at the $i^{th}$ frequency according to the received $i^{th}$ performance data, wherein M and i are natural numbers larger than 0, M>i.

9. The apparatus for switching performance as claimed in claim 8, wherein the performance adjusting apparatus is a south bridge chip for receiving the power supply data output by the load detection circuit via a GPIO interface.

10. The apparatus for switching performance as claimed in claim 8, wherein the working power supply comprises a working current, the load detection circuit comprising:

a comparison circuit, coupled to the power supply and the performance adjustable circuit, for receiving the working current and outputting an $i^{th}$ adjusting data when the working current falls between the $i^{th}$ threshold data and the $(i+1)^{th}$ threshold data; and a logic circuit, coupled to the comparison circuit, for outputting the $i^{th}$ performance data according to the $i^{th}$ adjusting data.

11. A method for switching performance, comprising:

providing a performance adjustable circuit working at a specific threshold frequency;

determining a working power supply of the performance adjustable circuit; and adjusting the performance adjustable circuit to work at another specific threshold frequency when the working power supply is higher or lower than a specific threshold level range corresponding to the specific threshold.

12. The method for switching performance as claimed in claim 11, wherein the step of determining the working power supply of the performance adjustable circuit comprises:

providing a power supply data according to the value of the working power supply.

13. The method for switching performance as claimed in claim 12, wherein the step of adjusting the performance adjustable circuit to work at another specific threshold frequency when the working power supply is higher or lower than a specific threshold level range corresponding to the specific threshold comprises:

providing a plurality of threshold data, wherein the $i^{th}\sim(i+1)^{th}$ threshold data represent the $i^{th}$ specific threshold level range;

providing a plurality of threshold frequencies corresponding to the threshold data; and controlling the performance adjustable circuit to operate at the $i^{th}$ threshold frequency when the power supply data falls between the $i^{th}$ threshold data and the $(i+1)^{th}$ threshold data, wherein i is a natural number.

14. The method for switching performance as claimed in claim 11, wherein the performance adjustable circuit comprises a CPU, and the first specific frequency is the operating frequency of the CPU.

15. The method for switching performance as claimed in claim 11, wherein the performance adjustable circuit comprises a CPU fan, and the first specific frequency is the operating frequency of the CPU fan.

16. The method for switching performance as claimed in claim 11, wherein the performance adjustable circuit comprises a clock generating circuit, and the first specific frequency is the clock frequency of the clock generating circuit.

17. The method for switching performance as claimed in claim 11, wherein the working power supply comprises a working current.

18. The method for switching performance as claimed in claim 11, wherein the working power supply comprises a working voltage.

19. The method for switching performance as claimed in claim 13, further comprising:

detecting the type of the CPU; and determining the threshold data according to the type of the CPU.

* * * * *